A. B. WALTON.
WATER LEVEL INDICATING SYSTEM AND APPARATUS.
APPLICATION FILED DEC. 18, 1909.
1,172,650.
Patented Feb. 22, 1916.
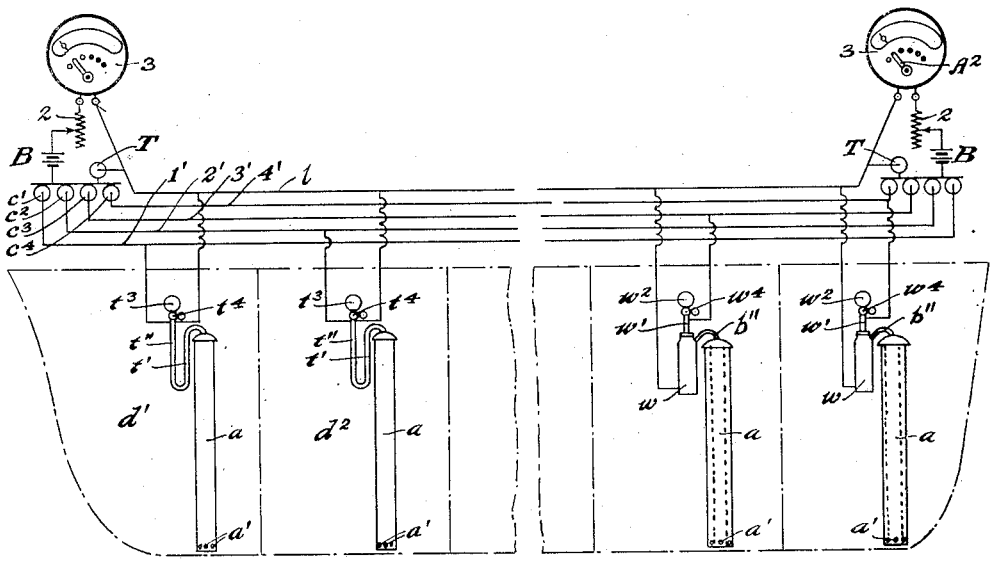
Fig. I
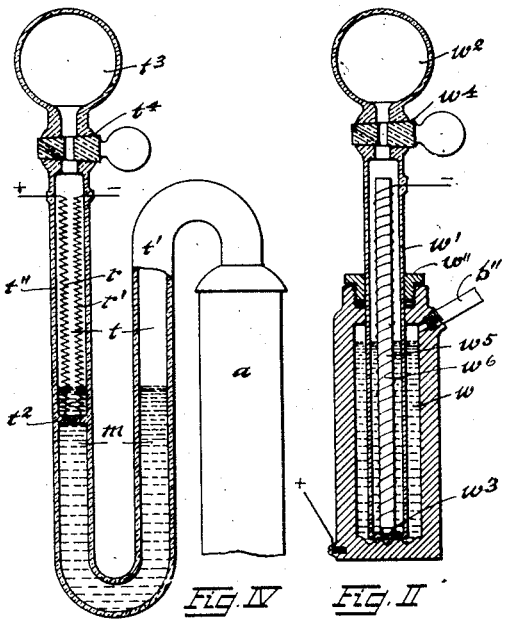
Fig. IV
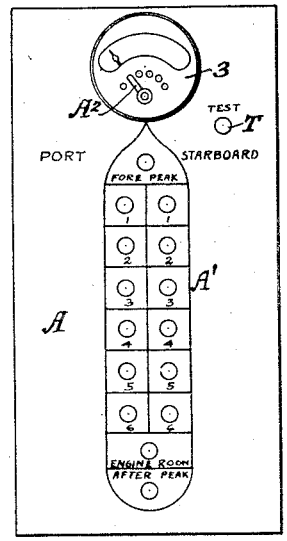
Fig. II
Fig. III
Witnesses:
F. C. Valentine
V. G. Armstrong
Inventor:
Allyn B. Walton,
by his attorney.

UNITED STATES PATENT OFFICE.

ALLYN B. WALTON, OF LORAIN, OHIO

WATER-LEVEL-INDICATING SYSTEM AND APPARATUS.

1,172,650.   Specification of Letters Patent.   Patented Feb. 22, 1916.

Application filed December 18, 1909. Serial No. 533,947.

*To all whom it may concern:*

Be it known that I, ALLYN B. WALTON, a citizen of the United States of America, and a resident of the city of Lorain, county of Lorain, and State of Ohio, have invented certain new and useful Improvements in Water-Level-Indicating Systems and Apparatus, of which the following is a specification, reference being had to the accompanying drawings, forming a part thereof.

My invention relates to improvements in water level indicating system and apparatus, and has for its object the provision of means for directly indicating at a distance the varying levels in water ballast tanks, or the bilge of steamships.

Although I am aware that a number of electrical and mechanical indicators have previously been devised, it is well known that the ordinary sounding rod or line is still resorted to, because of certain complications and features of unreliability in all previous devices with which I am acquainted. Thus, a system depending upon the use of a float, or of unsubstantial apparatus which may be subjected to the violent action of the water in the tank or bilge, will be found under ordinary sailing conditions to be inadequate and unreliable, even though well adapted for service upon shore. Accordingly, my purpose has been to provide thoroughly practical means for equipping a vessel, so that the readings or measurements may be positively obtained under all conditions, and may be simultaneously secured in the wheel house, engineroom, the captain's room, or in other places about the vessel, as required.

In my Patent 1,049,952 dated Jan. 7, 1913, I have illustrated means for securing these results. In the present application, I have adapted said means to improved apparatus of my invention operating by electricity with mercury-contact appliances therefor.

Referring first in a preliminary way to the apparatus and system of my invention, I may state that within the several water ballast compartments, or within the bilge of the vessel are provided pipes, perforated from below, to permit the flow of water.

Connected respectively with the tops of said pipes are suitable mercury-contact devices, preferably operated by the air pressure within the upper portions of the pipes. These contact devices may operate against balanced columns of mercury alone; one of which in turn immerses the electrical contacts or resistance wires, or an unbalanced condition may be obtained by causing the mercury to operate against partial vacuum, or compressed air, to secure corresponding variation in the readings, or the operating air-pressure may be varied.

Connected with said contact devices in multiple relation, is a suitable source of electrical energy, and at the points where the readings are to be made, there are positioned in potential circuit therewith, suitably calibrated electrical measuring apparatus and switches, or manual contact mechanism for establishing circuit with the respective mercury-contact appliances of the tanks.

Preferably this switching apparatus takes the form of a diagram board, whereon the various compartments of the vessel are correspondingly indicated by a manual contact or switch, and the measuring apparatus positioned immediately adjacent, will indicate the different water levels. Suitable means are provided for readjusting the apparatus from time to time; the details of all the foregoing being more fully explained in connection with the accompanying drawings, wherein:—

Figure I is a diagram illustrating my system as applied to four compartments of steamships, for indicating at two different points the water levels in the various compartments. Fig. II illustrates as partly broken away and in section, the preferred mercury-contact device and one of the connecting pipes. Fig. III shows the preferred form of switching or contact making mechanism, in association with a calibrated measuring instrument, which apparatus I may term the diagram board, and Fig. IV shows a modified mercury-contact appliance.

Throughout the several figures of the drawings, I have employed the same character of reference to indicate similar parts.

Certain structural details in the drawings will first be explained, and then by the aid of diagrams, the complete system of my invention will be more readily understood. Since the apparatus of my invention must be subjected to severe working conditions, I have sought first to equip the vessel so that the simplest apparatus, suitably protected may be used, and its operation will not be interfered with by the pitching or rolling of the vessel, and the movement of the water within the several compartments. Accordingly, the several contact appliances may be favorably positioned and suitably protected against damage, each being connected with a pipe suitably perforated or open at the bottom to permit the passage of water; said pipes being mounted directly upon the hull or bulkhead, in the different compartments of the vessel. Connected with each of the said mercury contact appliances, are circuit wires leading to suitably calibrated indicating apparatus and switching mechanism for connecting any of said electrodes with a source of electric current or currents. Accordingly, the indicating apparatus may be duplicated and placed in the various positions of the vessel, as required. Primarily, these positions are in the wheel house and in the engine room, so that the pumps controlling the water in the various tanks may be under the intelligent supervision of the commanding officer and chief engineer. The importance of this cannot well be over estimated, to vessels equipped with water ballast compartments adapted for trimming the steamship under conditions of shifting cargo, rapid loading, or varying weather conditions.

Referring now to the drawings, the pipes $a$ are provided with openings $a'$ near their bases, and are respectively positioned in the various compartments wherein the water levels are to be indicated. Associated with each of said pipes, is a mercury-contact appliance hermetically connected, or in other words, sealed in air-tight relation with the tops of said pipes, substantially as shown in Figs. II or IV.

The latter contact appliances comprise a U-shaped tube $t$ of insulating material, wherein is positioned a balanced or substantially balanced column of mercury $m$ in either limb. The right hand limb $t'$ is connected with the pipe $a$, while the left hand limb $t''$, preferably is provided with a restricted opening $t^2$, through which the mercury is adapted to flow, and with an expansion or compression chamber $t^3$ controlled by a cock $t^4$.

Within the limb $t''$, there are also provided resistance wires or conductors $r$ $r'$, which electrically connect with each other through the body of mercury, and extend through the upper walls of the tube $t''$ for connection with the electrical indicating system.

This mercury-contact device $t$ may well be constructed of glass, and the chamber $t^3$, may either be filled with air under predetermined pressure, or may be partially exhausted for controlling the movements of the body of mercury $m$, as will be explained more fully.

One of the resistance wires of each mercury-contact device, is connected with the common return conductor $l$. Associated with said conductor fore and aft, is an adjustable resistance 2, a suitable source of current B, and a meter 3, suitably calibrated to secure the readings in feet and inches, preferably. Conductors $1'$, $2'$, $3'$ and $4'$, respectively extend from the resistances or electrodes $r'$ of the mercury-contact appliances to corresponding switch apparatus or push buttons $c'$ $c^2$, $c^3$ and $c^4$, preferably situated upon a diagram board A, Fig. III. Thus the circuit through the measuring instrument 3, is adapted to be closed through any one of said contact appliances, and the associated measuring instrument either fore or aft.

It will be observed that upon the diagram board is shown in plan view A', the relation of the several tanks or water containing compartments upon the vessel, so that the engineer or officer, by pressing the corresponding button, may at once read in feet and inches upon instrument 3, the depth of water in any compartment. An additional push-button T is provided for testing the battery, so that the resistance 2 may be adjusted, as by turning the finger-piece $A^2$.

Suitably indicated upon the diagram board and associated with the corresponding contacts are the forepeak, the after peak and engine room compartments and the first to sixth star board and port compartments, respectively, just as they are arranged in the particular vessel for which the diagram board is especially designed.

Inasmuch as pipes $a$ are open at the bottom for the free flow of water, it will be seen that the height of the water within the several compartments will be substantially that within the corresponding pipes, and in consequence, air pressures in the upper portions thereof, will correspondingly unbalance the mercury columns in the limbs $t'$ $t''$ of the contact appliances, thereby varying the active resistances of the conductors or electrodes $r$ $r'$, as more or less of their lengths become immersed in the mercury. Consequently, the respective resistances, in terms of feet and inches, however, may be read upon the instrument.

Since the more accurate readings are desirable for the lower levels of the compartments, preferably the mercury columns are unbalanced by partially rarefying the air in chamber $t^3$, so that the effect of the high specific gravity of mercury, 13.6, will be partially overcome, and the body of mercury in the limb $t''$, will fluctuate through a greater distance during the initial stages or water levels within the compartments.

For the purpose of minimizing the incidental fluctuations in the level of the mercury, due to the rolling or pitching of the vessel, I have provided the constricted opening $t^2$ within the limb $t''$ of the mercury-contact device, the limbs or walls thereof serving to form a support or anchorage as well, for the resistances or electrodes $r\ r'$.

From the foregoing, it will be seen that the height of water in any of the various compartments $d'\ d^2$, etc., may be indicated upon either of the instruments 3, positioned forward and aft upon the diagram of the vessel, by reason of their respective connection with the switching or contact-making appliances associated with, and likewise positioned thereon. Thus, the engineer in charge will know at once, or may be directed from the wheel house, which of the compartments is to be filled or emptied, or the height of the water in any of such compartments may be directly determined; it being understood that all of the compartments are equipped with suitable electrodes, electrically connected in the manner indicated by the diagram, and variably connected through the medium of a body of mercury under the influence of air pressure.

Inasmuch as my improved mercury-contact is not actuated directly by the water pressure, and may be situated conveniently adjacent to the tank, it is open to ready inspection, adjustment and repair, as opposed to devices which operate directly by water pressure, and in consequence, must be located within or near the bottom of a tank.

For the purpose of obtaining closer readings, and affording a more substantial mercury-contact appliance, I have devised the structure shown in Fig. II, and indicated in the after compartments of the diagram, Fig. I.

As before, the connected pipe $a$ has an opening at the bottom, permitting the water to assume the same level as in the inclosing tank.

Pipe $a$, however, is of restricted diameter, and has a differently constructed contact device for hermetically connecting with the top thereof, by means of the tube $b''$. This connects with the mercury well $w$, which may be formed of steel, wherein is positioned the glass tube $w'$. This is hermetically sealed to the well by means of the stuffing box $w''$, while the expansion chamber $w^2$, and a restricted orifice $w^3$ for the mercury, are provided, whose purposes have previously been explained in connection with the contact device of Fig. IV.

The area of the mercury body, between the walls of well $w$ and the tube $w'$, is so calculated as to be materially less than, or approximately one-half that of the connected pipe $a$, for the purpose of securing an increased sensitiveness of the mercury within the tube $w'$, through the disproportionate columns of contained air. The cock $w^4$ is provided for controlling the expansion chamber $w^2$.

The well $w$ is connected directly to one side of the indicating circuit for establishing electrical contact with the contained body of mercury $m$, while within the tube $w'$ is an insulating rod $w^5$ spirally wound with a resistance conductor $w^6$, forming the electrode for insuring the electrical variation in the circuit. This resistance conductor is connected with the opposite side of the circuit, as indicated in Fig. I.

With the device described, it will be seen that the movement of the mercury column within the tube $w'$, will be proportionate to the change of air pressure within connected pipe $a$, being dependent in turn upon the height of the water within said pipe, and by varying the relative areas of the pipe and of the space within the well $w$, the movement of the mercury body may be correspondingly proportioned to the movement of the water.

In the contact appliance just described, the mercury body is relatively small, and is normally contained within the inclosing steel casing or well. It is not subjected to the action of the water, and its movement may be regulated by the rarefaction or compression of the air within the expansion chamber $w^2$. Moreover, the device is simple and is better adapted for the purpose set forth, than any other with which I am acquainted. Accordingly, its use where severe service is to be encountered, is recommended, and the same is adaptable to other purposes beside that specifically set forth herein. Each of the contact members described is provided with two connected mercury columns, which oppose or substantially balance each other, and these may be defined as balanced limbs or branches.

Having now described apparatus embodying my invention, including the preferred types thereof, and their mode of employment, I claim as new and desire to secure by Letters Patent, the following:—

1. In a water level indicator, the combination with an electrical measuring instrument, of a plurality of electrical switches adapted individually to connect therewith, said indicator being provided with a diagram whereon said switches are positioned in arrangement to indicate the different water-containing compartments and electrically-operated water-level appliances respectively associated with said compartments and switches, substantially as set forth.

2. In a water level indicator, the combination with a suitably calibrated electrical measuring instrument, of a plurality of associated switches adapted individually to connect therewith, said indicator being provided with a diagram indicating the water-containing compartments of a vessel; each diagrammed compartment having associated therewith one of said switches and electrically-operated water-level appliances respectively associated with said compartments and switches, substantially as set forth.

3. In a water-level indicating system, the combination with a base or support provided with a diagram indicating the several compartments of a vessel, and with associated contact appliances respectively positioned upon said diagram, of an electrical measuring instrument adapted to be connected through any of said contact appliances, and electrically-operated appliances for gaging the water-level, adapted respectively to be associated with the vessel's compartments, substantially as set forth.

4. A fluid-contact device comprising a tubular receptacle, affording two substantially balanced limbs or branches, a resistance conductor or electrode therein, a fluid conductive body within said tube adapted to immerse variable portions of said electrode, and one of the limbs or branches being sealed against the admission of external air and including a sealed expansion chamber containing a gaseous medium under less pressure than the external air, substantially as set forth.

5. A fluid-contact device comprising a tubular receptacle, affording two substantially balanced limbs or branches, a resistance conductor or electrode therein, a fluid conductive body within said tube adapted to immerse variable portions of said electrode; said tube being provided with a constricted passage-way for regulating the movement of the fluid body, and one of the limbs or branches being sealed against the admission of external air and including an expansion chamber adapted to contain a gaseous medium under different pressure than the external air, substantially as set forth.

6. A fluid-contact device comprising a tubular receptacle, affording two substantially balanced limbs or branches, a resistance conductor or electrode therein, a fluid conductive body within said tube adapted to immerse variable portions of said electrode, one of the limbs or branches being sealed against the admission of external air and including an expansion chamber adapted to contain a gaseous medium under different pressure than the external air, and a controlling valve associated therewith for connecting and disconnecting the expansion chamber, substantially as set forth.

7. In a water level indicating appliance, the combination with a receptacle hermetically closed at the top and open at the bottom wherein the water is adapted to flow, of a fluid-contact device connected with the upper portion of said receptacle, comprising a tubular member affording two substantially balanced limbs or branches, a fluid conductive body sealing the same, and an electrode adapted to be variably immersed by said fluid body, whereby the electrical resistance through the device may be altered by the air pressure within one limb of said contact-device, substantially as set forth.

8. In a water level indicating appliance, the combination with a receptacle hermetically closed at the top and open at the bottom and affording relatively small containing capacity, wherein the water is adapted to flow, of a fluid-contact device connected with the upper portion of said receptacle, comprising a tubular well affording substantially two balanced limbs or branches having predetermined or calculated volume proportionate to the volume of the receptacle, a conductive fluid body within the well, and an associated electrode adapted to be variably immersed by said fluid body, whereby the electrical resistance through the device may be disproportionately altered by the air pressure within one limb of said tubular well and the connected receptacle, substantially as set forth.

9. In a contact appliance of the class described, the combination with a tubular well, of a communicating tube partially filling the same and provided with a restricted orifice in its lower portion, a fluid conductive body therein, an electrode positioned within the tube and with which said conductive body is adapted to make variable contact, and means for applying variable pressure to the surface of the conductive body, whereby its contact with the electrode is varied, substantially as set forth.

10. In a water-level indicating appliance, the combination with a receptacle hermetically closed at the top and open at the bottom, of a mercury contact device hermetically connected with the top of said receptacle; the same affording two substantially balanced limbs for the mercury, one of which is subjected to the air pressure within said receptacle, a body of mercury within said receptacle, and an electrode or resistance conductor adapted to be variably immersed by said mercury, substantially as set forth.

In testimony whereof I affix my signature in presence of two witnesses.

ALLYN B. WALTON. [L. S.]

Witnesses:
J. M. JONES,
J. A. CCZOD.